United States Patent
Zyss et al.

(10) Patent No.: US 7,120,546 B2
(45) Date of Patent: Oct. 10, 2006

(54) INTEGRATED SPECTRUM ANALYZER FOR TUNERS

(75) Inventors: Eli Zyss, Ramat-Hasharon (IL); Uri Garbi, Rosh Haain (IL); Alon Elhanati, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 93 days.

(21) Appl. No.: 10/421,184

(22) Filed: Apr. 23, 2003

(65) Prior Publication Data

US 2004/0212385 A1    Oct. 28, 2004

(51) Int. Cl.
    *G01R 23/00*    (2006.01)
(52) U.S. Cl. .............. 702/76; 702/75; 324/76.19; 324/76.22
(58) Field of Classification Search ............ 702/75–77, 702/66, 69, 71, 73, 117, 118, 122, 124, 126, 702/183, 189, 190; 324/76.19, 76.21, 76.22, 324/76.24, 76.28, 76.29, 76.38, 76.43, 76.44, 324/76.47, 76.55, 76.58; 375/224, 228, 259, 375/316, 340, 225, 257; 455/226.1, 226.2, 455/226.4, 66.1, 67.11, 67.14, 67.7, 115.1–115.4; 370/241
See application file for complete search history.

(56) References Cited

U.S. PATENT DOCUMENTS

| 4,020,332 | A | * | 4/1977 | Crochiere et al. | .......... 708/290 |
| 4,302,631 | A | * | 11/1981 | Shenoi et al. | ............... 379/339 |
| 4,950,999 | A | * | 8/1990 | Agnello et al. | .......... 324/76.22 |
| 5,872,480 | A | * | 2/1999 | Huang | ........................ 329/304 |
| 6,714,605 | B1 | * | 3/2004 | Sugar et al. | ................ 375/340 |
| 6,754,487 | B1 | * | 6/2004 | Sanders et al. | ............. 455/423 |
| 2003/0165205 | A1 | * | 9/2003 | Chu et al. | ................... 375/346 |

OTHER PUBLICATIONS

Microsoft Press Computer Dictionary, second edition, 1994, p. 56.*

* cited by examiner

*Primary Examiner*—Hal D. Wachsman
(74) *Attorney, Agent, or Firm*—Wade James Brady III; Frederick J. Telecky, Jr.

(57) ABSTRACT

A scheme to provide a spectral view of the signals present at the customer premises equipment by the network operator and includes a digital signal processor (DSP) or other signal processing apparatus integrated into a customer premises equipment (CPE) tuner in which the DSP or other signal processing apparatus is operational to perform a spectral analysis.

14 Claims, 1 Drawing Sheet

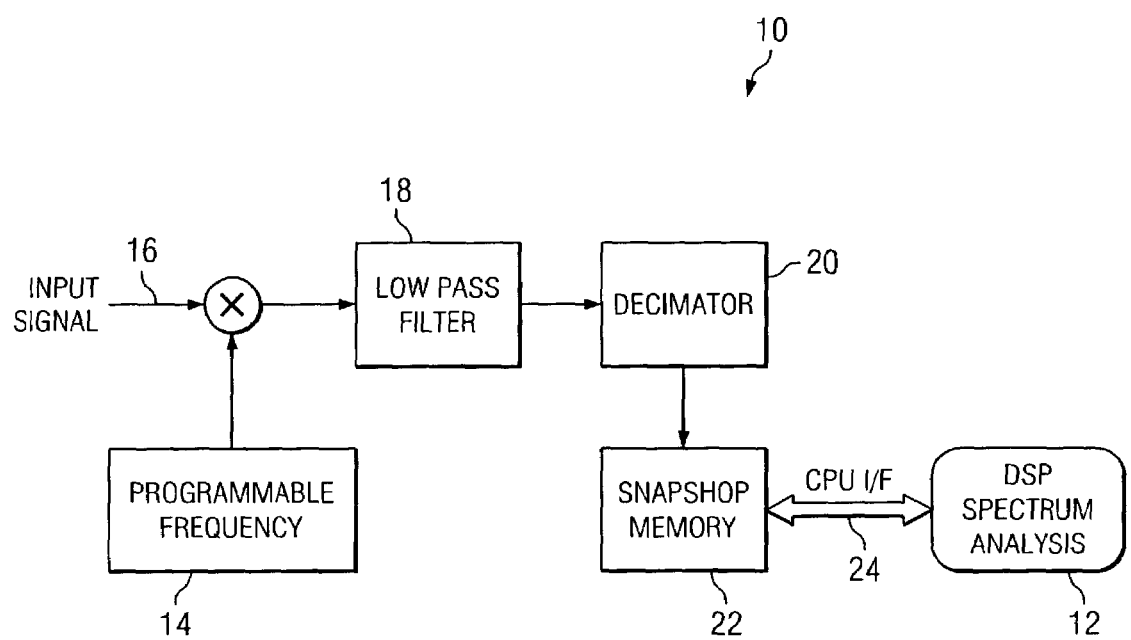

INTEGRATED SPECTRUM ANALYZER FOR TUNERS

BACKGROUND OF THE INVENTION

1. Field of the Invention

This invention relates generally to data communication systems and methods, and more particularly to a technique for providing a spectral view of the signals present at the customer premises equipment (CPE).

2. Description of the Prior Art

In cable broadband applications, as well as in other RF applications (e.g. LMDS, MMDS), and specifically in point to multi-point applications, the network operator can strongly benefit from having a spectral view of the signals present at the customer premises equipment (CPE). In the absence of such means, the operator is forced to visit the customer's site with specialized and expensive testing equipment for maintenance and technical malfunction events.

In view of the foregoing, a need exists in cable broadband applications, other RF applications and point to multi-point applications, for a scheme to provide a spectral view of the signals present at the customer premises equipment without requiring an operator to visit the customer's site.

SUMMARY OF THE INVENTION

The present invention is directed to a scheme to provide a spectral view of the signals present at the customer premises equipment without requiring an operator to visit the customer's site. The scheme is particularly useful in cable broadband applications, other RF applications, and specifically point to multi-point applications.

According to one embodiment, an integrated spectrum analysis system comprises a programmable down converter operational to shift an input signal frequency to a desired frequency; a low pass filter operational to filter the shifted frequency input signal and generate a filtered output signal at the desired frequency there from; a decimator operational to convert the filtered output signal at the desired frequency to a stream of digital samples at the same or lower rate; a snapshot memory operational to selectively store data corresponding to the stream of digital samples at the same or lower rate; and a digital signal processor (DSP) in communication with the snapshot memory via a data interface bus, wherein the DSP is operational to perform a spectrum analysis of the selectively stored data.

According to another embodiment, a method of performing spectrum analysis on a data communication input signal comprises the steps of providing a customer premises equipment having an integrated digital signal processor (DSP); shifting a data communication input signal frequency to a desired frequency; filtering the shifted frequency input signal and generating a filtered output signal at the desired frequency there from; converting the filtered output signal at the desired frequency to a stream of digital samples at the same or lower rate; selectively storing a snapshot of the digital samples; communicating the stored digital samples to the integrated DSP via a data interface bus; and performing a spectrum analysis of the selectively stored digital samples via the integrated DSP.

According to yet another embodiment, an integrated spectrum analysis system comprises means for programmably frequency shifting an input signal frequency to a desired frequency; means for filtering the shifted frequency input signal and generating a filtered output signal at the desired frequency there from; means for converting the filtered output signal at the desired frequency to a stream of digital samples at the same or lower rate; means for selecting storing a snapshot of the stream of digital samples at the same or lower rate; and means for performing a spectrum analysis of the selectively stored data without use of specialized portable testing equipment.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figure thereof and wherein:

The FIGURE is a block diagram illustrating an integrated spectrum analyzer for tuners according to one embodiment of the present invention.

While the above-identified drawing FIGURE sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, a network operator associated with cable broadband applications, as well as other RF applications (e.g. LMDS, MMDS), and specifically in point to multi-point applications, can strongly benefit from having a spectral view of the signals present at the customer premises equipment. The present inventors alone recognized that an integrated spectrum analyzer for tuners could provide a spectral view of the signals present at the customer premises equipment without requiring an operator to visit the customer's site.

Looking now at the FIGURE, a block diagram illustrates an integrated spectrum analyzer 10 for tuners according to one embodiment of the present invention. More specifically, a digital signal processing (DSP) block 12 is integrated within the customer premises equipment. The DSP 12 is enabled to supply the spectral information either locally or via the network. The DSP 12 block may be implemented as a hard-coded or integrated digital signal processor or any other system host processor already present in the system.

The integrated spectrum analyzer 10 can be seen to include a programmable frequency converter 14 that operates on the input signal 16 to systematically shift the input signal frequency to a desired frequency. This desired frequency signal is then processed by a low pass filter 18 and passed through a decimator 20 where the input stream of signal samples at the desired frequency is converted to a stream of digital samples at the same or lower rate (generally divided by an integer division factor DF of the input rate. A snapshot memory 22 systematically stores a history of the decimator 20 output samples that are then transmitted via an interface (I/F) bus (e.g. CPU I/F) 24 to a DSP 12 that performs a spectrum analysis in response to a desired algorithmic software. The resultant spectral analysis data can be easily communicated back to the network operator via the associated communication network. Using this spectral analysis data, the network operator can spot technical malfunction events and perform maintenance operations without the necessity of visiting the customer's site with specialized and expensive testing equipment, allowing for more efficient and cost effective network supervision and management.

In view of the above, it can be seen the present invention presents a significant advancement in the broadband, RF, and specifically point to multi-point application arts. It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. An integrated spectrum analysis system comprising:
   a programmable down converter operational to reduce an input signal frequency to a desired frequency;
   a low pass filter operational to filter the reduced frequency input signal and generate a filtered output signal at the desired frequency there from;
   a decimator operational to convert the filtered output signal at the desired frequency to a stream of digital samples at the same or lower rate than the desired frequency;
   a snapshot memory operational to selectively store data corresponding to the stream of digital samples at a lower frequency; and
   a digital signal processor (DSP) in communication with the snapshot memory via a data interface bus, wherein the DSP is operational to perform a spectrum analysis of the selectively stored data.

2. The integrated spectrum analysis system according to claim 1, wherein the lower rate corresponds to the input signal rate divided by an integer division factor.

3. The integrated spectrum analysis system according to claim 1, wherein the DSP is further operational to communicate spectrum analysis data via the data interface bus to a network administrator.

4. The integrated spectrum analysis system according to claim 1, wherein the integrated spectrum analysis system is configured as a customer premises equipment tuner for at least one application selected from the group consisting of broadband applications, radio frequency applications, and point to multi-point applications.

5. A method of performing spectrum analysis on a data communication input signal, the method comprising the steps of:
   providing a customer premises equipment having an integrated digital signal processor (DSP);
   shifting a data communication input signal frequency to a desired frequency;
   filtering the shifted frequency input signal and generating a filtered output signal at the desired frequency there from;
   converting the filtered output signal at the desired frequency to a stream of digital samples at the same or lower rate than the desired frequency;
   selectively storing a snapshot of the digital samples;
   communicating the stored digital samples to the integrated DSP via a data interface bus; and
   performing a spectrum analysis of the selectively stored digital samples via the integrated DSP.

6. The method according to claim 5, wherein the customer premises equipment comprises a tuner configured for at least one application selected from the group consisting of broadband applications, radio frequency applications, and point to multi-point applications.

7. An integrated spectrum analysis system comprising:
   means for programmably frequency converting an input signal frequency to a desired frequency;
   means for filtering the desired frequency input signal and generating a filtered output signal at the desired frequency there from;
   means for converting the filtered output signal at the desired frequency to a stream of digital samples at the same or lower rate than the desired frequency;
   means for selectively storing a snapshot of the stream of digital samples at the same or lower rate than the desired frequency; and
   means for performing a spectrum analysis of the selectively stored samples without use of specialized portable testing equipment.

8. The integrated spectrum analysis system according to claim 7, wherein the means for programmably frequency converting the input signal frequency to a desired frequency comprises a programmable frequency converter.

9. The integrated spectrum analysis system according to claim 7, wherein the means for filtering the frequency shifted input signal and generating a filtered output signal at the desired frequency there from comprises a low pass filter.

10. The integrated spectrum analysis system according to claim 7, wherein the means for converting the filtered output signal at the desired frequency to a stream of digital samples at the same or lower rate comprises a decimator.

11. The integrated spectrum analysis system according to claim 7, wherein the means for selecting storing a snapshot of the stream of digital samples at the same or lower rate than the desired frequency comprises a snapshot memory.

12. The integrated spectrum analysis system according to claim 7, wherein the means for performing a spectrum analysis of the selectively stored data without use of specialized portable testing equipment comprises an integrated digital signal processor.

13. The integrated spectrum analysis system according to claim 7, wherein the means for programmably frequency converting an input signal frequency to a desired frequency, means for filtering the shifted frequency input signal and generating a filtered output signal at the desired frequency there from, means for converting the filtered output signal at the desired frequency to a stream of digital samples at the same or lower rate than the desired frequency, means for selectively storing a snapshot of the stream of digital samples at the same or lower rate than the desired frequency, and means for performing a spectrum analysis of the selectively stored samples without use of specialized portable testing equipment are configured as a customer premises equipment (CPE) tuner.

14. The integrated spectrum analysis system according to claim 13, wherein the CPE tuner is configured for at least one application selected from the group consisting of broadband applications, radio frequency applications, and point to multi-point applications.

* * * * *